United States Patent
Straarup

(10) Patent No.: US 10,851,918 B2
(45) Date of Patent: Dec. 1, 2020

(54) UNBONDED FLEXIBLE PIPE

(71) Applicant: National Oilwell Varco Denmark I/S, Brondby (DK)

(72) Inventor: Anders Straarup, Valby (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 327 days.

(21) Appl. No.: 15/751,632

(22) PCT Filed: Aug. 8, 2016

(86) PCT No.: PCT/DK2016/050266
§ 371 (c)(1),
(2) Date: Feb. 9, 2018

(87) PCT Pub. No.: WO2017/025100
PCT Pub. Date: Feb. 16, 2017

(65) Prior Publication Data
US 2018/0231151 A1    Aug. 16, 2018

(30) Foreign Application Priority Data
Aug. 10, 2015  (DK) .................................. 2015 70516

(51) Int. Cl.
*F16L 11/08*   (2006.01)
*F16L 53/37*   (2018.01)
*F16L 53/38*   (2018.01)

(52) U.S. Cl.
CPC ............. *F16L 11/083* (2013.01); *F16L 53/37* (2018.01); *F16L 53/38* (2018.01)

(58) Field of Classification Search
CPC ........... F16L 11/083; F16L 53/37; F16L 53/38
(Continued)

(56) References Cited

U.S. PATENT DOCUMENTS 2,883,513 A * 4/1959 Schnabel ................ F16L 33/22
219/528
4,903,735 A * 2/1990 Delacour ................ F16L 11/10
138/133
(Continued)

FOREIGN PATENT DOCUMENTS

EP       2653288 A1    10/2013
WO   2008/119676 A1    10/2008
(Continued)

OTHER PUBLICATIONS

Extended European Search Report for Application No. 16834698, dated Jan. 15, 2019.
(Continued)

*Primary Examiner* — Ibrahime A Abraham
*Assistant Examiner* — Frederick F Calvetti
(74) *Attorney, Agent, or Firm* — Pearne & Gordon LLP

(57) ABSTRACT

The present invention relates to an unbonded flexible pipe having a length and a longitudinal axis and comprising, from the inside and out, a carcass made from an electrically conductive material, an internal pressure sheath made from an extruded polymer, at least one external armor layer and an outer sheath, in which the carcass is adapted for connection to an electric power source for conducting an electric current. Moreover, at least a part of the external armor layer is electrically conductive, the carcass and the external armor layer allowing a difference in electric potential to be established partly or fully over the internal pressure sheath, wherein the internal pressure sheath is partly or fully covered by a conforming cover layer made from a material which is electrically conductive and has a bulk resistance larger than the specific resistance of the electrically conductive material of the carcass.

13 Claims, 3 Drawing Sheets

Figure 1:
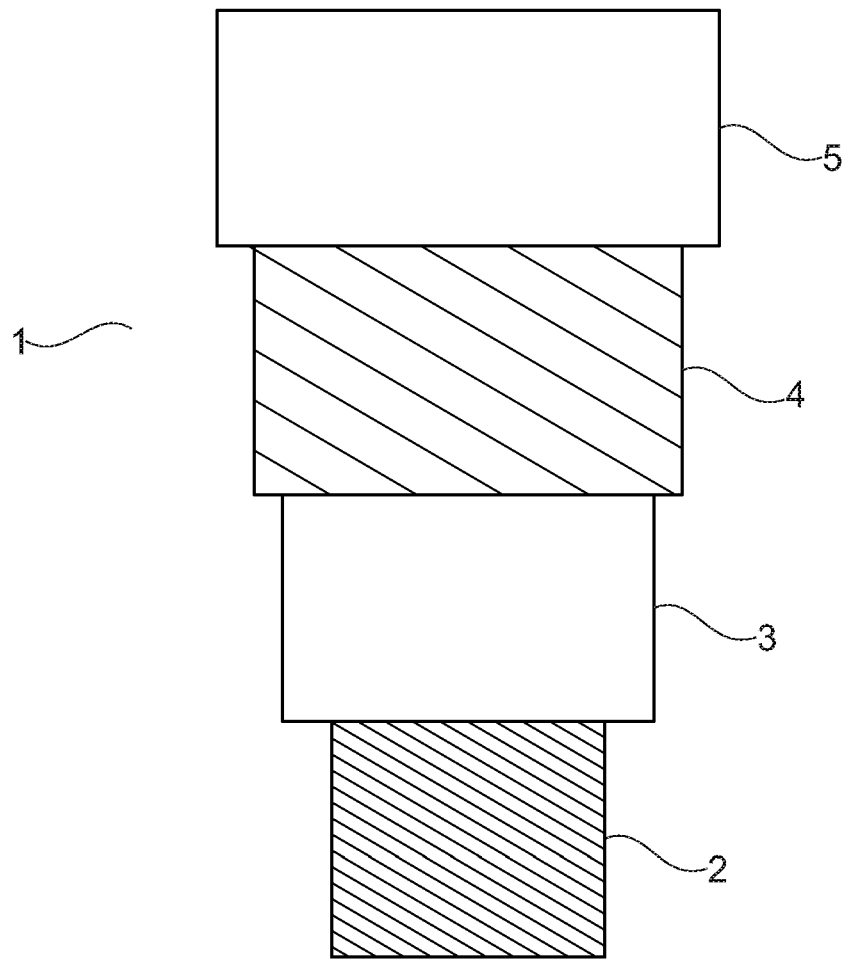

(58) Field of Classification Search
USPC .......................................................... 392/478
See application file for complete search history.

(56) References Cited

U.S. PATENT DOCUMENTS

| | | | | |
|---|---|---|---|---|
| 5,289,561 | A * | 2/1994 | Costa Filho | F16L 11/127 392/478 |
| 5,975,119 | A * | 11/1999 | Silva | E03B 7/12 137/341 |
| 6,142,707 | A * | 11/2000 | Bass | E21B 17/015 405/158 |
| 6,978,806 | B2 * | 12/2005 | Glejbol | F16L 11/083 138/134 |
| 7,123,826 | B2 * | 10/2006 | Belcher | B82Y 30/00 392/478 |
| 7,124,780 | B2 * | 10/2006 | Dupoiron | F16L 11/16 138/134 |
| 7,493,918 | B2 * | 2/2009 | Thomson | F16L 11/082 138/121 |
| 8,997,792 | B2 * | 4/2015 | Betsinger | G01N 27/20 138/36 |
| 9,482,373 | B2 * | 11/2016 | Glejbol | F16L 11/14 |
| 9,772,053 | B2 * | 9/2017 | Procida | B32B 5/024 |
| 9,851,027 | B2 * | 12/2017 | Anelli | F16L 11/083 |
| 9,989,183 | B2 * | 6/2018 | Glejbol | F16L 53/34 |
| 10,151,418 | B2 * | 12/2018 | Colcombet | F16L 11/125 |
| 10,544,892 | B2 * | 1/2020 | Holst | F16L 11/081 |
| 10,655,772 | B2 * | 5/2020 | Larsen | F16L 53/34 |
| 2004/0060610 | A1 * | 4/2004 | Espinasse | F16L 11/083 138/134 |
| 2010/0308575 | A1 * | 12/2010 | Rodenburg | F16L 11/127 285/256 |
| 2012/0217000 | A1 * | 8/2012 | Bremnes | E21B 17/01 166/57 |
| 2013/0276930 | A1 | 10/2013 | Harries et al. | |
| 2013/0276931 | A1 | 10/2013 | Fernando et al. | |
| 2013/0340877 | A1 * | 12/2013 | Kassow | F16L 33/01 138/137 |
| 2014/0076450 | A1 * | 3/2014 | Glejbol | E21B 17/015 138/118.1 |
| 2016/0003382 | A1 | 1/2016 | Glejbol | |
| 2016/0178106 | A1 * | 6/2016 | Glejbol | F16L 11/081 138/130 |
| 2016/0243742 | A1 | 8/2016 | Fernando et al. | |
| 2017/0299092 | A1 * | 10/2017 | Larsen | F16L 53/38 |
| 2018/0231163 | A1 * | 8/2018 | Holst | F16L 33/01 |

FOREIGN PATENT DOCUMENTS

| | | |
|---|---|---|
| WO | 2011/120525 A1 | 10/2011 |
| WO | 2014/023311 A1 | 2/2014 |
| WO | 2014/032674 A1 | 3/2014 |
| WO | 2014/187462 A1 | 11/2014 |
| WO | 2015/014365 A1 | 2/2015 |
| WO | 2015/059480 A1 | 4/2015 |
| WO | 2015/097278 A1 | 7/2015 |
| WO | 2016/062319 A1 | 4/2016 |

OTHER PUBLICATIONS

Danish Search Report for Application No. PA 2015 70516, dated Mar. 10, 2016.
International Search Report for International Application No. PCT/DK2016/050266, dated Sep. 26, 2016.
"Recommended Practice for Flexible Pipe", ANSI/API Recommended Practice 17B, Fourth Edition, Jul. 2008.
"Specification for Unbonded Flexible Pipe", ANSI/API Specification 17J, Third Edition, Jul. 2008.

* cited by examiner

-- PRIOR ART --

UNBONDED FLEXIBLE PIPE

The present invention relates to an unbonded flexible pipe having a length and a longitudinal axis and comprising, from the inside and out, a carcass made from an electrically conductive material, an internal pressure sheath made from an extruded polymer, at least one external armour layer and an outer sheath, in which the carcass being adapted for connection to an electric power source for conducting an electric current.

TECHNICAL FIELD

Unbonded flexible pipes are frequently used as flexible risers or flexible flowlines for the transport of fluids including hydrocarbons such as oil and gas.

Moreover, unbonded flexible pipes are often used e.g. as riser pipes or flowlines in the production of oil or other subsea applications.

The unbonded flexible pipes are constructed of a number of independent layers, such as helically laid steel and polymeric layers formed around a central bore for transporting fluids. A typical unbonded flexible pipe comprises, from the inside and outwards, an inner armouring layer known as the carcass, an internal pressure sheath surrounded by one or more armouring layers, such as pressure armouring and tensile armouring, and an outer sheath. Thus, the carcass and the internal pressure sheath form a bore in which the fluid to be transported is conveyed. In some unbonded flexible pipes the carcass may be omitted and the internal pressure sheath forms the bore. When the carcass is omitted, the bore is denoted a smooth bore. When the carcass is present, the bore is denoted a rough bore. The annular space between the internal pressure sheath and the outer sheath is known as the annulus and houses the pressure armouring and the tensile armouring.

The unbonded flexible pipes may carry the fluids between a hydrocarbon reservoir located under the seabed and a floating structure. The fluid may be a hydrocarbon fluid, such as natural gas or oil, depending upon the nature of the hydrocarbon reservoir, or an injection fluid such as water. The fluids, which are transported to the floating structure, may be processed, for example by compression and/or further treatment. When the floating structure is moored close to a gas field or hydrocarbon reservoir, it can be kept in fluid communication with the producing well heads via one or more flexible risers. The one or more flexible risers can convey fluids between the well heads of a hydrocarbon reservoir and the floating structure. Flexible risers may be configured as free-hanging catenaries or provided in alternative configurations, such as lazy wave and lazy S types, using buoyancy modules. Thus, a flexible riser can be connected at one end to the floating structure, and at another end to a riser base manifold, which can secure the flexible riser to the seabed.

When the hydrocarbon enters the floating structure it is common to treat the hydrocarbon and prepare it for use in processes, such as cracking, refining etc. Examples of floating structures, which have such capacities, are vessels like FPSO's (floating production and storage offloading).

In recent years it has also become common to equip the flexible unbonded pipes with heating systems, such as electric heating. The electric heating systems may utilize the metallic armour layers in the unbonded flexible pipe.

The armouring layers comprise or consist of multiple elongated armouring elements that are not bonded to each other directly or indirectly via other layers along the pipe. Thereby the pipe becomes bendable and sufficiently flexible to roll up for transportation. The armouring elements are very often manufactured from metallic and electrically conductive material.

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. As mentioned such pipes usually comprise an innermost sealing sheath—often referred to as an internal pressure sheath, which forms a barrier against the outflow of the fluid which is conveyed in the bore of the pipe, and one or usually a plurality of armouring layers. Normally the pipe further comprises an outer protection layer, often referred to as the outer sheath, which provides mechanical protection of the armour layers. The outer protection layer may be a sealing layer sealing against ingress of sea water. In certain unbonded flexible pipes one or more intermediate sealing layers are arranged between armour layers.

In general flexible pipes are expected to have a lifetime of 20 years in operation.

The term "unbonded" means in this context that at least two of the layers including the armouring layers and polymer layers are not bonded to each other. In practice the known pipe normally comprises at least two armouring layers located outside the internal pressure sheath and optionally an armour structure located inside the internal pressure sheath, which inner armour structure normally is referred to as the carcass.

In recent years some types of flexible unbonded pipes have been equipped with heating systems, such as electric heating, in particular unbonded flexible pipes for use in cold environments. The electric heating system may utilize the metallic armour layers in the unbonded flexible pipe.

A system in which the carcass is utilized as a heating element has been developed. An electric current is sent through the carcass, which due to the resistance in the metallic material results in Joule heating of the carcass. The electric current may be returned to a power source via a pressure armour layer or a tensile armour layer. The internal pressure sheath will function as an electrical insulator between the electrically conductive layers.

The internal pressure sheath is typically made from an extruded polymer material such as e.g. polyethylene, polyamide or polyvinylidene difluoride, and forms a barrier layer. Due to the way the pipe is operated there will be a significant voltage drop over the pressure sheath. This voltage drop may result in build-up of charged domains on either surface of the pressure sheath. When these charges reach a critical level, they may give rise to local electric discharges which may result in rapid degradation of the pressure sheath material. This effect, dubbed silent discharges, is a common known phenomenon in the field of high power transmission lines, but until recently has been completely unknown in the field of flexible pipe systems.

The occurrence of partial discharges is detrimental to the internal pressure sheath over time and must be avoided.

DISCLOSURE OF INVENTION

An object of the present invention is to provide an unbonded flexible pipe comprising an electric heating system with improved properties. The present invention provides a unbonded flexible pipe with an electric heating system in which the risk of partial discharge is minimized.

The present invention relates to an unbonded flexible pipe having a length and a longitudinal axis and comprising, from the inside and out,
a carcass made from an electrically conductive material,
an internal pressure sheath made from an extruded polymer, at least one external armour layer and an outer sheath,
the carcass being adapted for connection to an electric power source for conducting an electric current, at least a part of the external armour layer being electrically conductive, the carcass and the external armour layer allowing a difference in electric potential to be established partly or fully over the internal pressure sheath, wherein the internal pressure sheath is partly or fully covered with a conforming cover layer made from a material which is electrically conductive and having a bulk resistance larger than the specific resistance of the electrically conductive material of the carcass.

The term "bulk resistance" is defined as the resistance measured on a portion of material having the size 1×1×1 m, which has not been compressed to a pore-free condition, i.e. the material may comprise pores or voids. The specific resistance is the resistance measured on a portion of material having the size 1×1×1 m, which is pore-free. Thus, if the material on which the measurement is performed is pore-free, the bulk resistance and the specific resistance will be the same. Preferably, the carcass has a specific electrical resistivity of about $10^{-6}$ Ω·m or less.

The unbonded flexible pipe comprises a carcass inside the internal pressure sheath. The unbonded flexible pipe also comprises at least one external armour layer outside the internal pressure sheath.

The terms "inside" and "outside" a layer, such as e.g. the internal pressure sheath, of the pipe is used to designate the relative distance to the axis of the pipe, such that by "inside a layer" is meant the area encircled by the layer i.e. with a shorter radial distance than the layer and by "outside a layer" is meant the area not encircled by the layer and not contained by the layer, i.e. with a longer radial distance to the axis of the pipe than the layer. The longitudinal axis of the pipe also defines the center axis of the pipe, i.e. "longitudinal axis" and "center axis" may be used interchangeably.

Thus, the unbonded flexible pipe comprises a carcass inside the internal pressure sheath. Outside the internal pressure sheath the unbonded flexible pipe comprises at least one external armour layer. This at least one external armour layer may e.g. comprise one or two pressure armour layers and/or one or two tensile armour layers. The pressure armour layer and the tensile armour layer may be manufactured from an electrically conductive material. The carcass in an unbonded flexible pipe is preferably wound up from an elongate member such as a strip. The elongate member is wound up to form a tube and the winding degree is typically between 85° and 89.8°.

When the unbonded flexible pipe comprises one or more pressure armour layers, such layers are typically made from elongate members wound with an angle of approximately 65° to about 89.5° relative to the center axis. Frequently an unbonded flexible pipe comprises two pressure armour layers which may be wound either in the same or in opposite directions relative to the center axis.

The unbonded flexible pipe may also comprise one or more tensile armour layers. Very often an unbonded flexible pipe comprises two tensile armour layers which are wound in opposite directions relative to the center axis. The winding angle in respect of the center axis is approximately in the range of 25° to 55°.

When the unbonded flexible pipe is used with electric heating, electric current is sent through the carcass. This causes polarizing of the carcass relatively to the external armour layer, thus the internal pressure sheath sandwiched between these two layers will be subjected to a voltage difference which may lead to the occurrence of partial discharge.

The term "inner side" of a layer is the side of the layer facing the axis of the pipe. The term "outer side" of a layer is the side of the layer facing away from the center axis of the pipe.

On the outside of the internal pressure sheath a conforming cover layer is applied. Whereas the internal pressure sheath is an electrical insolator, the conforming cover layer is electrically conductive which prevents the formation of local electrically charged domains on the outer surface of the pressure sheath. The function of the conforming cover layer is not to transport current along the length of the pipe, but rather to ensure that small, charged domains are not formed, leading to partial discharge. Hence, only a very limited conductivity of the conforming cover layer is needed to obtain the desired function. Thus, when the conforming cover layer is electrically conductive and having a bulk resistance or specific resistance which is larger than the specific resistance of the carcass, the conforming cover layer will serve to absorb charges on the outer surface of the internal pressure sheath, whereby partial discharge may be avoided.

The extruded polymer of the internal pressure sheath is selected from the group consisting of polyolefins, such as polyethylene and poly propylene; polyamide, such as poly amide-imide, polyamide-11 (PA-11) and polyamide-12 (PA-12); polyimide (PI); polyurethanes; polyureas; polyesters; polyacetals; polyethers, such as polyether sulphone (PES); polyoxides; polysulfides, such as polyphenylene sulphide (PPS); polysulphones, such as polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers such as polyvinylidene diflouride (PVDF), homopolymers and copolymers of vinylidene fluoride ("VF2"), homopolymers and copolymers of trifluoroethylene ("VF3"), copolymers and terpolymers comprising two or more different members selected from the group consisting of VF2, VF3, chlorotrifluoroethylene, tetrafluoroethylene, hexafluoropropene, and hexafluoroethylene.

In contrast to the internal pressures sheath, the carcass is made from electrically conductive material, and the electrically conductive material of the carcass is a metallic material, such as steel, stainless steel, aluminium or titanium.

The at least one external armour is also made from electrically conductive material, such as steel, stainless steel, aluminium or titanium.

In an embodiment of the unbonded flexible pipe the outer sheath restricts the flow of electric current between the external armour layer(s) and the surrounding environment. Preferably the outer sheath is made from an electrically insulating polymer material. The polymer material of the outer sheath may be chosen from the same group of polymer material as the polymer material of the internal pressure sheath.

The conforming cover layer may be applied to the internal pressure sheath in several different ways.

Several methods are suitable for making the conforming cover layer, including:
  Application of electrically conducting grease on the outer side of the internal pressure sheath.
  Winding the outer side of the internal pressure sheath with an electrically conductive tape.

Co-extruding a thin layer of conductive material on the outer side of the internal pressure sheath.

In an embodiment the conforming cover layer is an extruded layer. Thus, the conforming cover layer may come into tight contact with the internal pressure sheath.

In an embodiment the conforming cover layer is a tape. To apply a tape is a fairly easy process during the production of the unbonded flexible pipe.

The material of the conforming cover layer may be selected from several types of material as stated below.

In an embodiment the conforming cover layer is a woven or non-woven fiber web.

In an embodiment the conforming cover layer is an extruded tape made from a conducting polymer In an embodiment of the unbonded flexible pipe the conforming cover layer is a polymer comprising carbon particles, metal particles, ceramic particles, glass particles or combinations thereof. Carbon particles, metal particles and certain ceramic and glass particles are electrically conductive and may improve the electrical properties of the conforming cover layer. The conforming cover layer may comprises from about 1% (w/w) to about 25% (w/w) of conductive particles or fibres, such as from about 2% (w/w) to about 20% (w/w) of conductive particles or fibres, conveniently from about from about 3% (w/w) to about 15% (w/w) of conductive particles or fibres.

In an embodiment the conforming cover layer is an extruded polymer layer comprising carbon particles. The carbon particles may have a surface area in the range 50-800 $m^2/g$ (BET), ASTM D3037, and the mean particle size may range from nano size to larger than 100 micrometer. Examples of carbon particles which may be used are ENSACO 150 g to 350 g and Ketjenblack EC-300J.

In an embodiment the conforming cover layer is a polymer tape re-inforced with fiber selected from metal fibers, polymer fibers, ceramic fibers, and/or glass fibers. The fibers serve to improve the strength of the tape, and when the fibers are metal fibers, these metal fibers may contribute to the electrical conductivity of the tape. The polymer fibers may e.g. be poly-aramid fibers. The electrical conductive fibers may e.g. be from titanium, copper, silver, gold, carbon or glass. The electrical conductive fibres may have a length in the range from about 100 micrometer to about 5 cm, such as from about 200 micrometer to about 4 cm. However, if the fibers are woven into the tape the fibres may be meter long. The thickness of the fibres may be in the range from about 5 micometer to about 200 micrometer.

In an embodiment the conforming cover layer is electrically conductive grease. Such grease may also be applied to the outer surface of the internal pressure sheath in an easy manner during production.

DETAILED DESCRIPTION OF THE INVENTION

Figure 2:
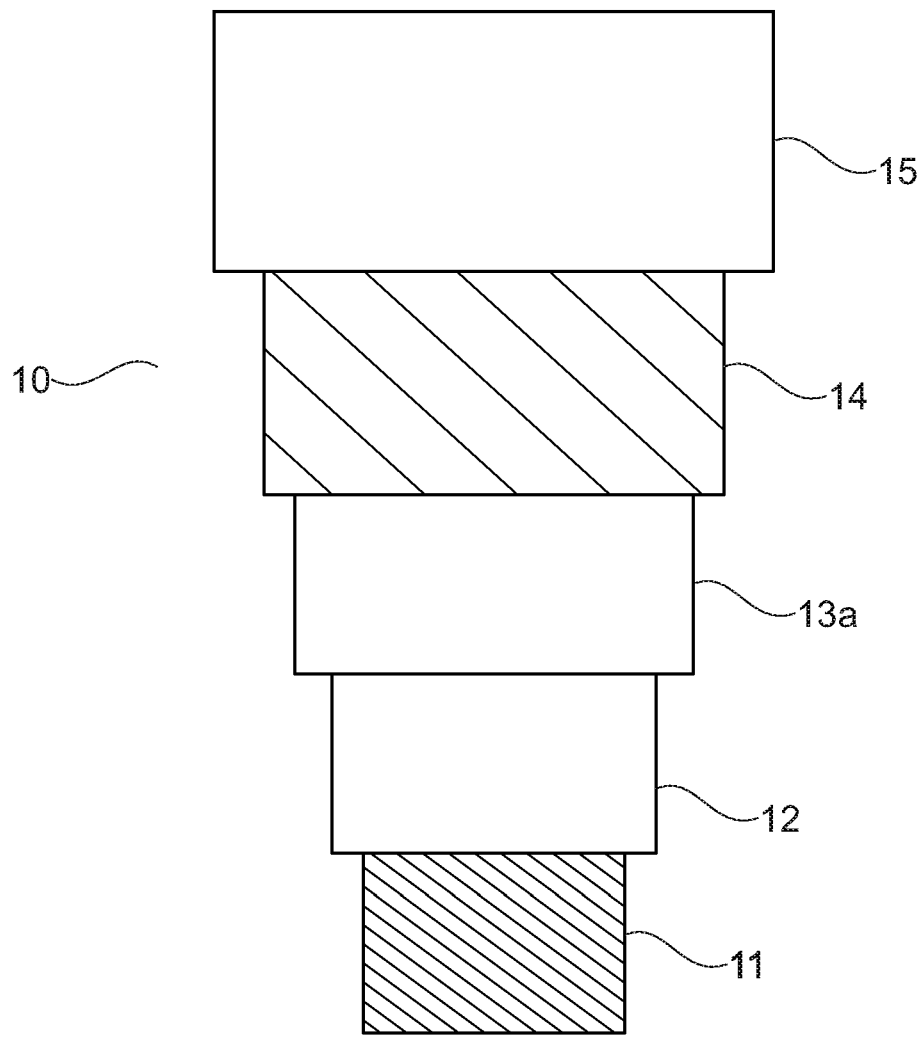
Figure 3:
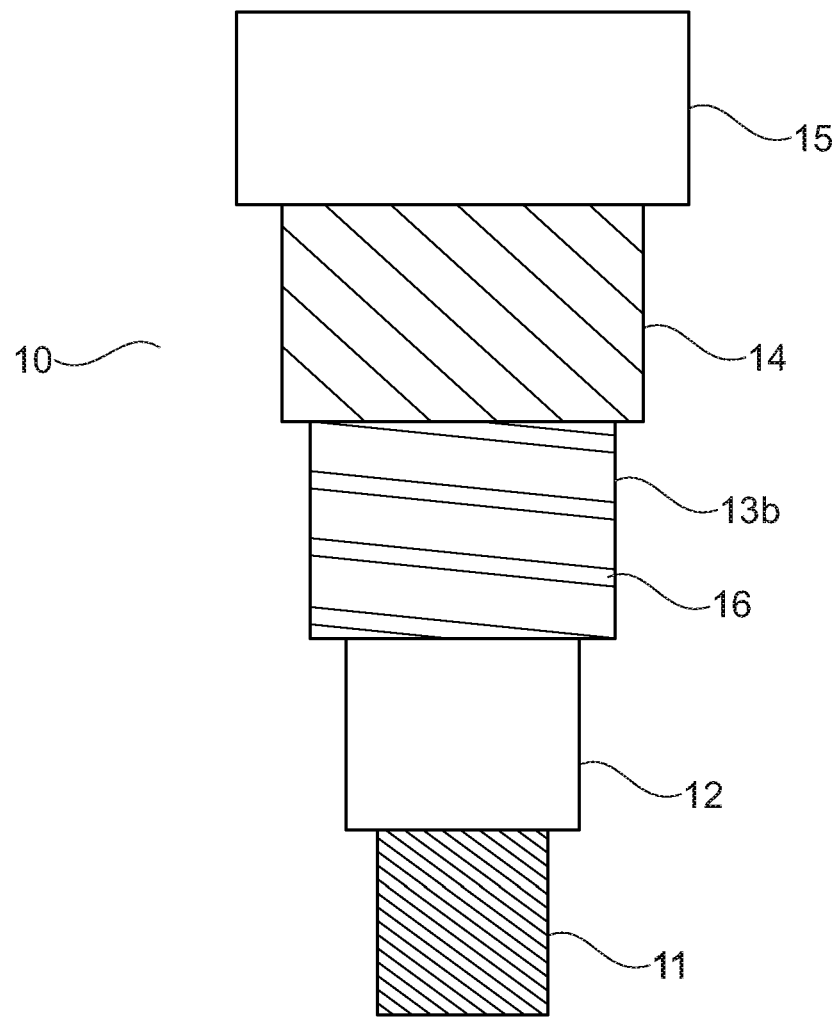

The invention will now be described in further details with reference to the embodiments shown in the drawing in which:

FIG. 1 schematically shows an unbonded flexible pipe;

FIG. 2 schematically shows an unbonded flexible pipe according to the invention;

FIG. 3 schematically shows an unbonded flexible pipe according to the invention;

The figures are not accurate in every detail but are only sketches intended to show the principles of the invention.

Details which are not a part of the invention may have been omitted. In the figures the same reference numbers are used for the same parts.

FIG. 1 schematically shows a conventional unbonded flexible pipe 1 comprising, from the inside an out, a carcass 2, an internal pressure sheath 3, an external armour layer 4, and an outer sheath 5. The internal pressure sheath 3 and the outer sheath 5 are extruded from a polymer material and are fluid-tight.

The carcass 2 and the external armour layer 4 which in this example is a tensile armour layer are wound from elongate metallic strips.

In this particular embodiment the unbonded flexible pipe is rather simple. More complicated unbonded flexible pipes may e.g. comprise one or two layers of pressure armour layers wound around the internal pressure sheath and one or two tensile armour layers wound around the pressure armour layers.

FIG. 2 shows an embodiment of an unbonded flexible pipe according to the invention adapted for electric heating. The unbonded flexible pipe 10 comprises, from the inside and out, a carcass 11, an internal pressure sheath 12, a conforming cover layer 13a, an external armour layer 14 and an outer sheath 15. This unbonded flexible pipe 10 is intended for applying electric heating to the fluid conveyed in the pipe. The electric heating is established by sending a current from a power source through the carcass layer 11 and preferably return the current to the power source via the external armour layer 14 which in this embodiment is a tensile armour layer. Both the carcass 11 and the tensile armour are made from stainless steel which is electrically conductive. The internal pressure sheath 12 is extruded high density polyethylene (HDPE). The outer sheath 15 is extruded polyvinylidene diflouride (PVDF). Both the internal pressure sheath 12 and the outer sheath 15 are fluid-tight.

The conforming cover layer 13a is made from extruded polyethylene comprising carbon particles, which makes the layer electrically conductive.

FIG. 3 shows an alternative embodiment of an unbonded flexible pipe according to the invention adapted for electric heating. The unbonded flexible pipe 10 comprises, from the inside and out, a carcass 11, an internal pressure sheath 12, a conforming cover layer 13b, an external armour layer 14 and an outer sheath 15. This unbonded flexible pipe 10 is intended for applying electric heating to the fluid conveyed in the pipe. The electric heating in this particular unbonded flexible pipe functions as in the unbonded flexible pipe shown in FIG. 2, thus, the electric heating is established by sending a current from a power source through the carcass layer 11 and preferably return the current to the power source via the external armour layer 14 which in this embodiment also is a tensile armour layer. Both the carcass 11 and the tensile armour are made from stainless steel which is electrically conductive. The internal pressure sheath 12 is extruded high density polyethylene (HDPE). The outer sheath 15 is extruded polyvinylidene diflouride (PVDF). The internal pressure sheath 12 and the outer sheath 15 are fluid-tight.

The conforming cover layer 13b is made from a wound polymer tape. In this embodiment the polymer tape is wound without overlapping and there is a gap 16 of about 0.3 cm to about 0.5 cm between each winding of the tape. In other embodiments the tape may be wound with overlapping windings. The tape is manufactured by extruding a polyethylene polymer comprising metal particles and metal fibers (having a length from about 0.5 cm to about 2.5 cm).

What is claimed is:

1. An unbonded flexible pipe having a length and a longitudinal axis and comprising, from the inside and out,
a carcass made from an electrically conductive material,
an internal pressure sheath made from an extruded polymer,
at least one external armor layer and an outer sheath,
the carcass being adapted for connection to an electric power source for conducting an electric current, at least a part of the external armor layer being electrically conductive, the carcass and the external armor layer allowing a difference in electric potential to be established partly or fully over the internal pressure sheath, wherein the internal pressure sheath is partly or fully covered by a conforming cover layer made from a material which is electrically conductive and having a bulk resistance larger than the specific resistance of the electrically conductive material of the carcass and wherein the conforming cover layer is located between the internal pressure sheath and the external armor layer.

2. The unbonded flexible pipe according to claim 1, wherein the extruded polymer of the internal pressure sheath is a substantially electrically insulating material.

3. The unbonded flexible pipe according to claim 1, wherein the extruded polymer of the internal pressure sheath is selected from the group consisting of polyolefins, such as polyethylene and poly propylene; polyamide, such as poly amide-imide, polyamide-11 (PA-11) and polyamide-12 (PA-12); polyimide (PI); polyurethanes; polyureas; polyesters; polyacetals; polyethers, such as polyether sulphone (PES); polyoxides; polysulfides, such as polyphenylene sulphide (PPS); polysulphones, such as polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers such as polyvinylidene diflouride (PVDF), homopolymers and copolymers of vinylidene fluoride ("VF2"), homopolymers and copolymers of trifluoroethylene ("VF3"), copolymers and terpolymers comprising two or more different members selected from the group consisting of VF2, VF3, chlorotrifluoroethylene, tetrafluoroethylene, hexafluoropropene, and hexafluoroethylene.

4. The unbonded flexible pipe according to claim 1, wherein the electrically conductive material of the carcass is a metallic material, such as steel, stainless steel, aluminium or titanium.

5. The unbonded flexible pipe according to claim 1, wherein the outer sheath restricts the flow of electric current between the external armor and the surrounding environment.

6. The unbonded flexible pipe according to claim 1, wherein the conforming cover layer is an extruded layer.

7. The unbonded flexible pipe according to claim 1, wherein the conforming cover layer is a tape.

8. The unbonded flexible pipe according to claim 1, wherein the conforming cover layer is a woven or non-woven fiber web.

9. The unbonded flexible pipe according to claim 1, wherein the conforming cover layer is electrically conductive grease.

10. The unbonded flexible pipe according to claim 1, wherein the conforming cover layer is a polymer.

11. The unbonded flexible pipe according to claim 1, wherein the conforming cover layer is a polymer comprising carbon particles, metal particles, ceramic particles, glass particles or combinations thereof.

12. The unbonded flexible pipe according to claim 1, wherein the conforming cover layer is a polymer tape re-inforced with fibers selected from metal fibers, polymer fibers, ceramic fibers, glass fibers or a combination hereof.

13. The unbonded flexible pipe according to claim 1, wherein the conforming cover layer is in direct contact with the internal pressure sheath.

* * * * *